United States Patent
Vizza

[15] 3,667,579
[45] June 6, 1972

[54] BRAKE OPERATED TRANSMISSION SHIFTER

[72] Inventor: Joseph Vizza, 414 Broad Avenue, Belle Vernon, Pa. 15012

[22] Filed: Nov. 18, 1970
[21] Appl. No.: 90,646

[52] U.S. Cl. ............................. 192/4 A, 192/4 A, 60/54.5 R
[51] Int. Cl. .......................................................... B60k 21/00
[58] Field of Search .................................................. 192/4 A

[56] References Cited

UNITED STATES PATENTS

| | | | |
|---|---|---|---|
| 3,426,624 | 2/1969 | Karig et al. | 192/4 A X |
| 2,208,364 | 7/1940 | Fusella | 192/4 A X |
| 2,872,000 | 2/1959 | Herndon et al. | 192/4 A X |
| 3,001,415 | 9/1961 | Smirl | 192/4 A X |

Primary Examiner—Benjamin W. Wyche
Attorney—Victor J. Evans & Co.

[57] ABSTRACT

An engine compression brake system in which an automatic transmission is down shifted to second gear and to low gear on moderate to heavy braking pressure applied to the brake pedal. The down shifting may be electrically actuated by pressure actuated switches which are exposed to the hydraulic pressure in the conventional brake system, by flexible cables which are moved by a piston system actuated by the hydraulic pressure in the conventional brake system and by mechanical linkage controlled by a separate foot pedal.

4 Claims, 6 Drawing Figures

INVENTOR.
JOSEPH VIZZA
BY Victor J. Evans & Co.
ATTORNEYS.

BRAKE OPERATED TRANSMISSION SHIFTER

BACKGROUND OF THE INVENTION

Field of the Invention

The present invention relates to the application of compression braking as an added speed retarding system for a motor vehicle.

SUMMARY OF THE INVENTION

The present invention includes a conventional hydraulic brake system the pressure of which is used to actuate a mechanical system or a electrical system to down shift the transmission upon moderate to heavy braking pressure on the brake pedal. A mechanical system including a separate brake pedal may also be used to down shift the transmission to achieve the benefit of compression braking when the conventional brakes are not applied.

The primary object of the invention is to provide auxiliary compression braking controlled by the driver.

Other objects and advantages will become apparent in the following specification when considered in the light of the attached drawings.

DESCRIPTION OF THE PREFERRED EMBODIMENT

Figure 1:
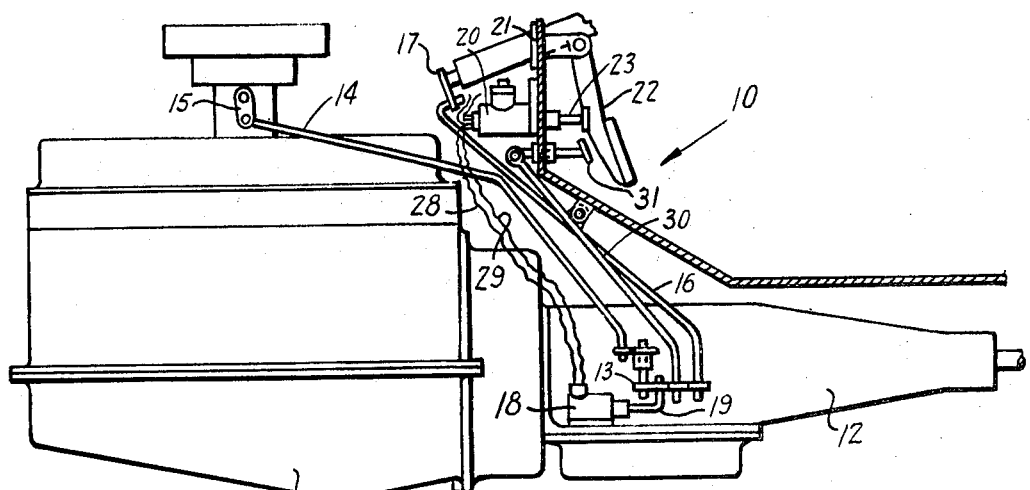
FIG. 1 is a side elevation of the invention.
Figure 2:
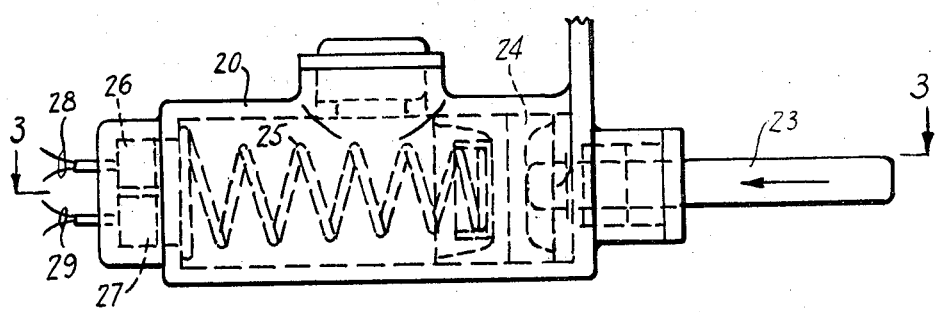
FIG. 2 is a side elevation of the master cylinder used with the invention of FIG. 1.
Figure 3:
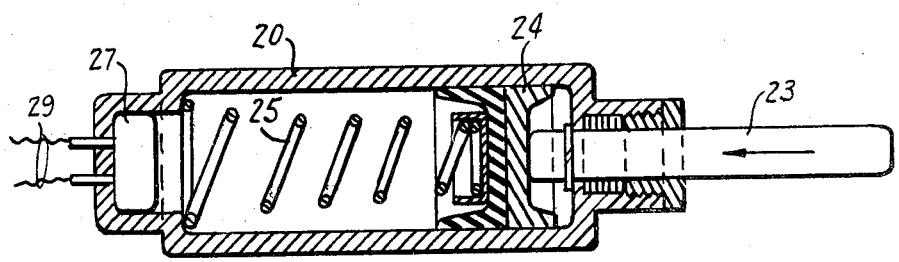
FIG. 3 is a transverse sectional view taken along the line 3—3 of FIG. 2, looking in the direction of the arrows.
Figure 4:
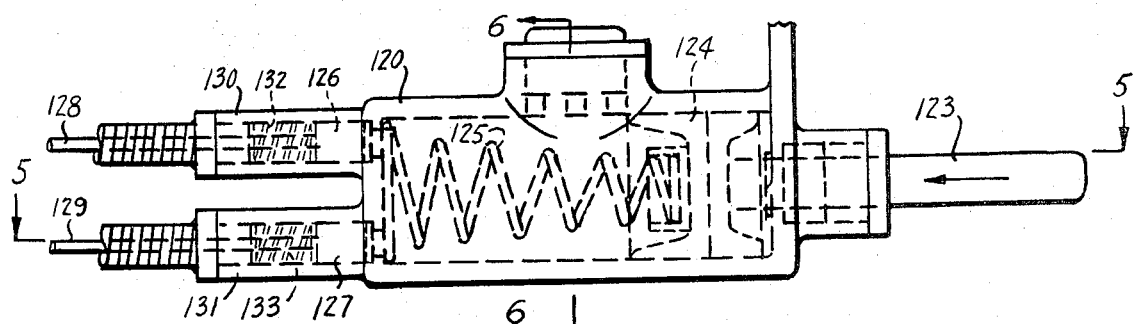
FIG. 4 is a side elevation of a master cylinder in a modified form of the invention.
Figure 5:
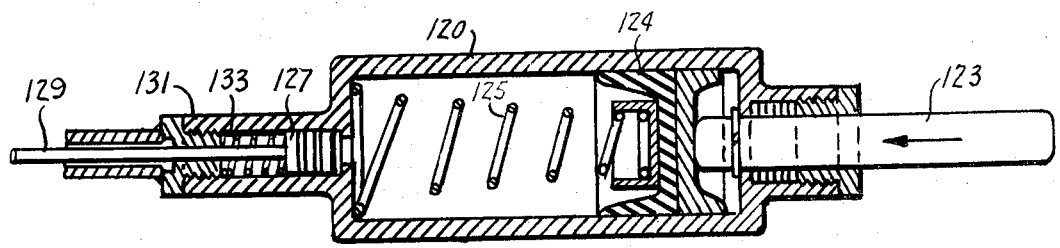
FIG. 5 is a transverse sectional view taken along the line 5—5 of FIG. 4, looking in the direction of the arrows.
Figure 6:
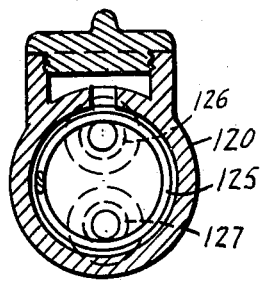
FIG. 6 is a vertical sectional view taken along the line 6—6 of FIG. 4, looking in the direction of the arrows.

Referring now to the drawings in detail wherein like reference characters indicate like parts throughout the several figures the reference numeral 10 indicates generally a compression braking system constructed in accordance with the invention.

The system 10 includes an internal combustion engine 11 having secured thereto an automatic transmission 12 normally controlled by the speed of the motor vehicle and the load applied thereto. The automatic transmission has a conventional actuating mechanism 13 mounted thereon and connected by a link 14 to the throttle control 15 of the internal combustion engine 11. A link 16 extends from the mechanism 13 to the steering column mounted shift linkage 17.

An electric actuator 18 is connected by a link 19 to the mechanism 13 to over ride the mechanism 13 and shift the transmission 12 to second and low.

A master cylinder 20 is conventionally mounted on the fire wall 21 of a motor vehicle for actuation by a brake pedal 22. A rod 23 extends out of the master cylinder 20 to engage the brake pedal 22 at its outer end and a piston 24 at its inner end. Reciprocation of the brake pedal 22 reciprocates the rod 23 and the piston 24 against a return spring 25. The piston 24 applies pressure to hydraulic fluid in the master cylinder 20 to actuate conventional hydraulic brakes in a conventional manner.

The master cylinder 20 additionally has a pair of pressure reponsive switches 26, 27 mounted in the end thereof opposite the rod 23. The pressure reponsive switches 26, 27 are selected so that a predetermined pressure will actuate the switch 26 and a predetermined higher pressure will actuate the switch 27. Wires 28 extend from the switch 26 to the electrical actuator 18 and wires 29 extend from the switch 27 to the electrical actuator 18.

When the switch 26 is closed with the application of moderate pressure to the brake pedal 22 the electrical actuator 18 shifts the transmission 12 into second gear so that the compressive forces of the engine 11 assist in slowing the vehicle during a braking cycle. When heavy pressure is applied to the brake pedal 22 the switch 27 is closed and the electrical actuator 18 shifts the transmission 12 into low gear to increase the compression braking force from the engine 11. Light pressure on the brake pedal 22 occures in normal stopping in city driving.

A link 30 extends from the mechanism 13 to a pedal 31 mounted on the fire wall 21 adjacent the brake pedal 22 so that it can be actuated by either movement of the brake pedal 21 or by pressure of the foot directly applied thereto. The linkage 30 will also move the mechanism 13 to down shift the transmission 12 to second and finally to low depending upon the amount of pressure applied to the foot pedal 31.

In a modified form of the invention a master cylinder 120 has a piston rod 123 which is adapted to reciprocate a piston 124 in the master cylinder 120 against the tension of a spring 125. The master cylinder 120 actuates the conventional hydraulic brakes in a conventional manner and additionally the hydraulic pressure in the master cylinder 120 presses on each of a pair of pistons 126, 127 connected to flexible cables 128 and 129 respectively. The pistons 126, 127 reciprocate in cylinders 130, 131 respectively against the tension of coil springs 132, 133.

The coil spring 132 is calibrated to permit the piston 126 to be moved by moderate hydraulic pressure in the master cylinder 120 and the spring 133 is calibrated to permit the piston 127 to move under high pressure of the hydraulic fluid in the master cylinder 120. The flexible cables 128, 129 are conventionally connected to the actuating mechanism 13 illustrated in FIG. 1 so that when the piston 126 moves the transmission 12 is down shifted to second and when the piston 127 moves the transmission 12 is down shifted to low to provide compression braking in accordance with the pressure applied to the hydraulic brake system.

Having thus described the preferred embodiment of the invention it should be understood that numerous structural modifications and adaptations may be resorted to without departing from the spirit of the invention.

It should also be noted that not only is the present invention utilized for the retarding of speed for a motor vehicle, but it can also be used for the acceleration of speed for safety passing by depressing the foot pedal adjacent to the brake pedal which will shift the transmission into second gear and holding the gas pedal at required speed which will give a quick pick-up without the jerk one gets when depressing the gas pedal all the way to the floor board in order to pick up speed for passing. It also saves on gas because every time the gas pedal is pushed all the way down, it pumps raw gasoline into the engine which is a waste of fuel and also increases pollution as all the gasoline does not burn.

What is claimed is:

1. A braking system for motor vehicles of the type including an internal combustion engine, an automatic transmission connected thereto and a hydraulic brake system including a master cylinder comprising means controlled by moderate actuation of the brake pedal of the hydraulic brake system for shifting the automatic transmission into second gear, means actuated by heavy pressure on the brake pedal for shifting the automatic transmission into low gear, the means for shifting the automatic transmission into second gear including a pressure actuated electric switch and an electric transmission actuator controlled by said pressure actuated electric switch.

2. A device as claimed in claim 1 wherein the means for shifting said automatic transmission into low gear includes a second pressure actuated electric switch connected to the electric actuator of said automatic transmission.

3. A braking system for motor vehicle of the type including an internal combustion engine, an automatic transmission connected thereto and a hydraulic brake system including a master cylinder comprising means controlled by moderate actuation of the brake pedal of the hydraulic brake system for shifting the automatic transmission into second gear, means actuated by heavy pressure on the brake pedal for shifting the automatic transmission into low gear, the means for shifting said automatic transmission into second gear including a piston actuated by the hydraulic pressure in the hydraulic brake system and a flexible cable extending from said piston to the automatic transmission for shifting the automatic transmission into second gear upon movement of said piston.

4. A device as claimed in claim 3 wherein the means for shifting the automatic transmission into low gear includes a second piston moveable under heavy pressure of the hydraulic fluid in the hydraulic brake system, and a flexible cable connecting said second piston to said automatic transmission for shifting said automatic transmission into low gear upon movement of said second piston.

* * * * *